United States Patent [19]

Florence et al.

[11] Patent Number: 4,672,439
[45] Date of Patent: Jun. 9, 1987

[54] FLIR IMAGER WITH HYBRID OPTICAL/ELECTRONIC PROCESSOR

[75] Inventors: James M. Florence; John B. Allen, both of Richardson, Tex.

[73] Assignee: Texas Instruments Incorporated, Dallas, Tex.

[21] Appl. No.: 772,491

[22] Filed: Sep. 4, 1985

[51] Int. Cl.[4] .............................................. H04N 5/33
[52] U.S. Cl. .................................... 358/113; 250/332; 358/225; 358/226; 358/227; 364/822
[58] Field of Search ............... 358/113, 225, 226, 227; 364/822; 250/342, 330, 332, 334

[56] References Cited

U.S. PATENT DOCUMENTS

| | | | |
|---|---|---|---|
| 3,883,689 | 5/1975 | Mansour | 358/227 |
| 4,053,773 | 10/1977 | Deresh | 358/113 |
| 4,091,414 | 5/1978 | Chow | 358/113 |
| 4,328,516 | 5/1982 | Colpack | 358/113 |
| 4,419,692 | 12/1983 | Modisette | 358/113 |
| 4,584,606 | 4/1986 | Nagasaki | 358/225 |

Primary Examiner—Howard W. Britton
Attorney, Agent, or Firm—Richard K. Robinson; Leo N. Heiting; Melvin Sharp

[57] ABSTRACT

A FLIR imager is modified to include a hybrid optical/electronic processor for automatic local area dynamic range normalization. FLIR imagers have an objective lens for focusing IR energy emanating from a scene on a detector array. The detector array generates electrical signals representative of the scene. LEDs generate a visible picture of the thermal image of the scene for a video processor for formatting the signals for a particular type display (TV). The hybrid optical/electronic processor is inserted between the LEDs and the video processor; it includes a beamsplitter for directing the image to a pair of CCD cameras. The image at one camera is set in sharp focus to preserve all of the spatial frequency content (allpass) through the image reconstruction optics. While the image at the second camera is slightly defocused for averaging image information over small local regions the size of the defocused point spread function (spatial lowpass filtered). The electrical signal outputs of the CCD cameras are connected to a differential amplifier for subtracting the lowpass image from the allpass image to produce the highpass image and amplification to bring the resulting signal level above the noise level of the CRT display; while the local average image output of the second camera is connected to a limiter for limiting the local average variations. A summing amplifier is used to bring the signal back together for restoring the visual impression of hot and cold objects without saturation or blanking and provide enhancement of image detail.

10 Claims, 6 Drawing Figures

FLIR IMAGER WITH HYBRID OPTICAL/ELECTRONIC PROCESSOR

BACKGROUND OF THE INVENTION

This invention relates to forward looking infrared (FLIR) imagers and more particularly to a FLIR imager having an hybrid optical/electronic processor for automatic dynamic range control and enhancement of forward looking infrared (FLIR) imagery.

A major problem exists in the display of infrared (IR) imagery on standard black and white cathode ray tube (CRT) monitors in that a typical infrared (IR) scene can have a very large dynamic range—in excess of 1000 to 1—while a cathode ray tube (CRT) has a dynamic range of about 200 to 1. If the fine details of the IR image is to be observable above the CRT noise, the signal gain at this point must be increased. But increasing the signal gain at this point can drive hot regions of the scene into saturation and blank-out cold regions. Detail in the hot and cold regions can be observed by adjusting the display level control, but the adjustments are mutually exclusive (raising the display level to observe cold detail drives more of the hot regions into saturation while lowering the level to observe hot detail blanks out more of the colder portions of the image). If the full range of scene temperatures from hottest to coldest is to be displayed on the linear portion of the CRT transfer characteristic (without saturation or blanking), then the signal again must be reduced to the point that scene detail will be lost. Thus, extracting information from an IR scene on a CRT monitor is a continuous hands-on process of adjusting display gain and level controls.

In the past techniques to automate the control of gain and display level control have included digital histogram modification techniques to redistribute the signal values within the dynamic range capability of the display. Discussions of this technique are contained in articles entitled "Image Processing By Digital Computer", H. C. Andrews, A. G. Tescher and R. P. Kruger, IEEE Spectrum 9. p. 20, July 1972; and "Almost Uniform Distributions for Computer Image Enhancement", E. L. Hall, IEEE Trans. on Computers C23, p. 207 (1974) The redistribution can be either a compression bringing large temperature variations within the display capabilities or an expansion adjusting very bland scenes to fill the display dynamic range. Histogram modifications act like nonlinear gain characteristics based on global scene temperature distributions. As a result, detail in small localized hot and cold regions (such as targets) can be lost while the more prevalent background detail is enhanced. The digital processors could be redesigned to perform histogram modification based on local statistics to preserve detail throughout the scene. The problems with this approach are the significantly more complicated digital hardware and/or the sacrifice of real-time operation.

A strictly analog enhancement technique called automatic low frequency gain leveling (ALFGL) was developed at the Night Vision Laboratory, Fort Belvoir, Va. The algorithm was developed by Sen-Te Chow. This system incorporates dynamic range limiting circuitry between the IR detectors and the LEDs used for visible image formation. In this technique the signal is clipped to limit the range of signal swings and then image detail is added back to the clipped regions. The ALFGL system operates in real-time on small targets as well as large background regions. The one-dimensions (1-D) nature of the electronic processing circuitry requires the electronic filters for the extraction of image detail to be causal linear phase filters. These filters have non-symmetrical impulse responses that produce noticeable non-symmetrical blurring or smearing of the processed image in the scan direction. Further, as the processing occurs before the visible image reconstruction, in two-way scan FLIR systems, a zig-zagged effect along any structural line that crosses the scan direction.

SUMMARY OF THE INVENTION

Accordingly it is an object of this invention to provide an improved optical/electronic processor for automatic dynamic range control and enhancement of FLIR imagery.

Another object of the invention is to provide an optical/electronic processor which utilizes two dimensional (2-D) information of the image in controlling dynamic range before display.

A further object of the invention is to provide an optical/electronic processor having improved enhancement of the image detail.

Briefly stated the invention comprises compressing the dynamic range of low frequency information and preserving image detail in the high frequency information to create a signal within the dynamic range of the display whereby manual adjustment of the display is not required to preserve image detail.

BRIEF DESCRIPTION OF THE DRAWINGS

Other objects and features of the invention will become more readily apparent from the following detailed description when read in conjunction with the accompanying drawings, in which.

DETAILED DESCRIPTION OF THE PREFERRED EMBODIMENTS

Figure 1:
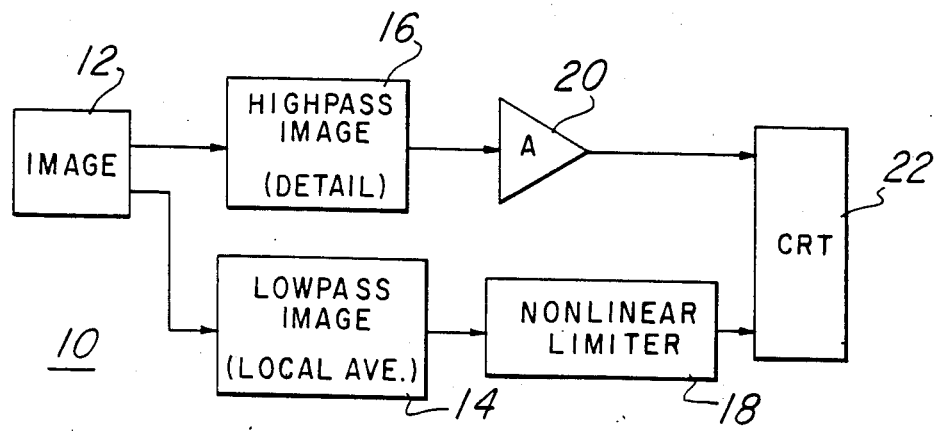
FIG. 1 is a block diagram of the optical image enhancement processor.

Referring now to FIG. 1, the optical image enhancement processor 10 includes an imaging means 12 for generating a low spatial frequency image 14 and a high spatial frequency image 16. The lowpass image is the local average information that represents the large scale relative temperature distribution in the scene, i.e., hot regions vs cold regions. The highpass image contains the fine structure detail of the image that is useful for target or structural identification. After the image is separated, the local average image (lowpass image) is limited by limiter 18 to the display capability and the detail (highpass) image is amplified by amplifier 20 to bring the detail variations above the display noise level.

The images are then recombined for display in the display means 22.

Figure 2:
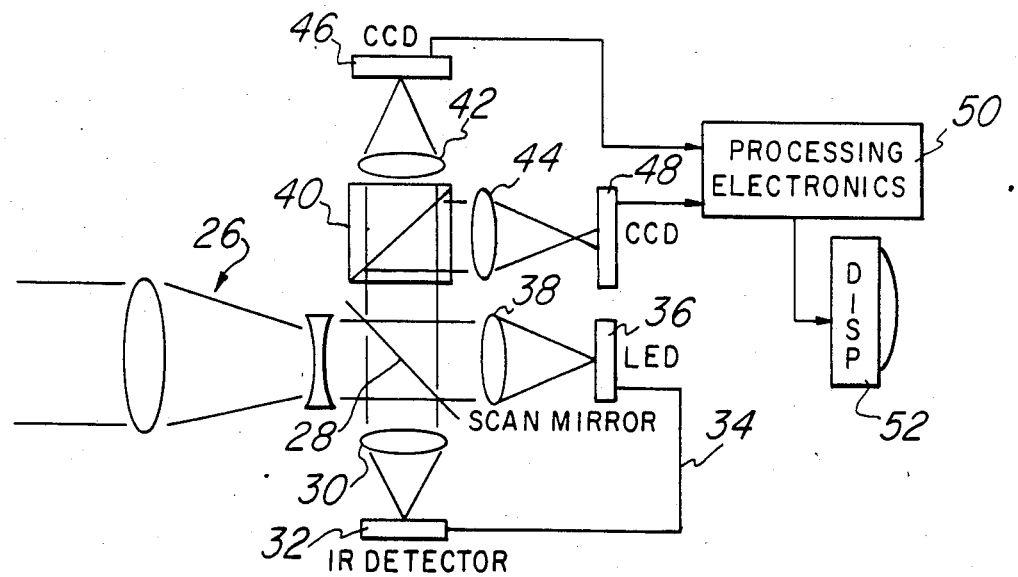
FIG. 2 is a view showing the implementation of the optical image enhancement processor with a modified thermal sight FLIR.

Referring now to FIG. 2, the optical image enhancement processor 10 is incorporated into a thermal image FLIR 24. The thermal imager FLIR 24 includes an afocal optics 26 for providing a wide angle field of view and a narrow angle field of view of the a scene emanating infrared energy, selectively, to a scan mirror 28. The scan mirror 28 reflects the energy to an objective lens 30 for focusing on the IR detector array 32. The IR detector array 32 converts the infrared energy impinging thereon into electrical signals representative of the impinging thermal energy scene. The IR detector array 32 is connected by lead 34 to a corresponding array of light emitting diodes (LEDs) 36 for producing a visible image of the thermal image.

The light energy produced by the LEDs 36 is collimated by lens 38 and reflected by a mirror fixed to the back side of scanner mirror 28 which reflects the light energy to a beamsplitter 40. Beamsplitter 40 directs the LED image simultaneously through focusing lenses 42 and 44 to two charge coupled device (CCD) type cameras 46 and 48, respectively. The CCD camera 46 is set in sharp focus to provide the image 12 which preserves all of the spatial frequency content possible through the image reconstruction optics. This image represents the full spatial frequency spectrum or all-pass reconstructed image 12. While the CCD camera 48 is slightly defocused to provide the image 14 which contains the averaged image information with the average taken over small local regions the size of the defocused point spread function. The two images 12 and 14 are formed at the scanner frame rate and then read out of the CCDs synchronously into the processing electronics or electronic portion of the processor. A display means 52 preferably a CRT is connected to the processing electronics for displaying the recombined image of the scene.

Figure 3:
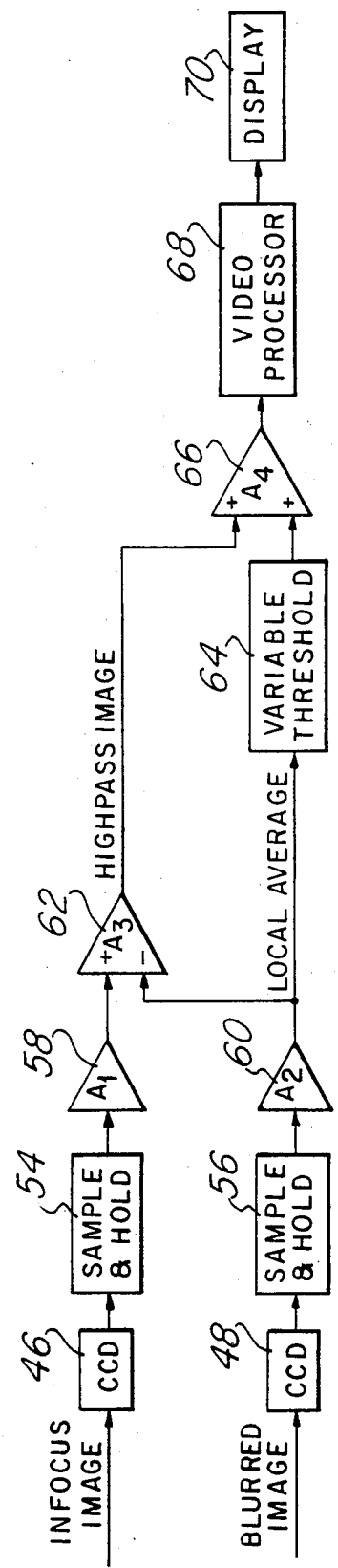
FIG. 3 is a schematic diagram partly in block form of the electronic portion of the optical image enhancement processor.

The electronic processor 50 (FIG. 3) includes sample and hold circuits 54 and 56 connected, respectively, to the output terminals of the CCD cameras 46 and 48. Amplifiers 58 and 60 are connected, respectively, to the output terminals of sample and hold circuits 54 and 56 for amplifying the lowpass image signal and the all-pass (in-focus) image signal to working levels. A difference amplifier 62 has its positive terminal connected to the all-pass image signal amplifier 58 and its negative terminal connected to the low pass image signal of amplifier 60 for subtracting the lowpass image signal from the all-pass (in-focus) image signal leaving only the high spatial frequency information (highpass image 16).

This step of synthesizing the highpass filter by subtracting the lowpass image from the in-focus image is necessary because the imaging systems (from the LEDs to the CCDs) are optically incoherent. An incoherent optical system processes intensity distributions and must therefore have an impulse response that is positive real (i.e., no negative energy). As a highpass filter impulse response is bipolar, it is impossible to implement such a filter in a single incoherent imaging system. The signal subtraction is a 1-D operation. But, the resulting synthesized highpass spatial filter is fully 2-D as the original all-pass image and lowpass image were formed in the 2-D optical systems. Simply highpass filtering the in-focus image signal with an electronic filter after the CCD would again result in undesirable 1-D effects in the processed image.

Figure 4:
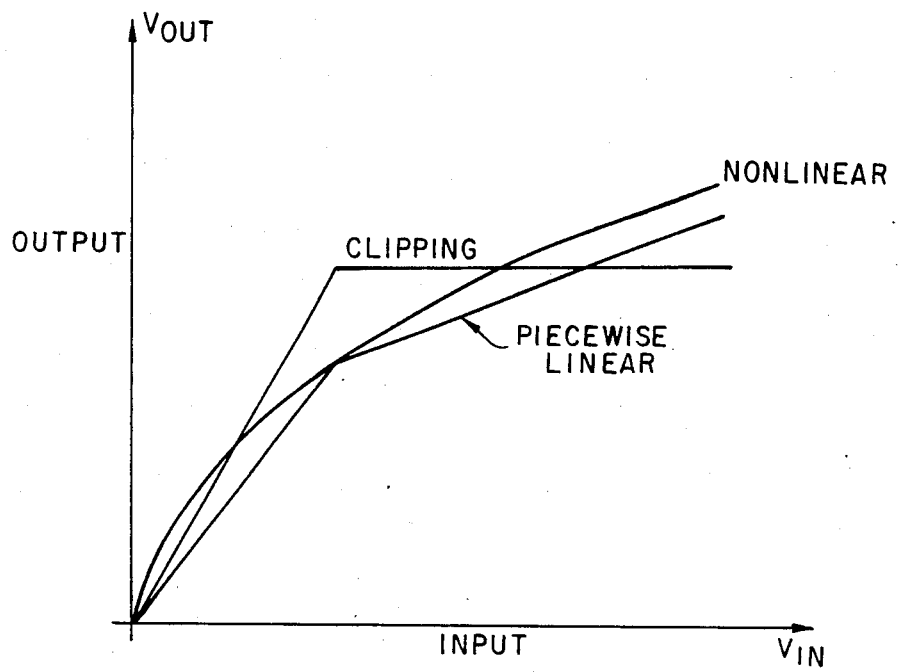
FIG. 4 is a diagram of possible transfer characteristics of the electronic portion of the processor.

A variable threshold limiting circuit 64 is operatively connected to the local average (lowpass image) amplifier 60 for limiting the local average variations. The amplifier 60 and variable threshold circuit constitutes a nonlinear limiting circuit. Some examples of possible transfer characteristics for the processing electronics are shown in FIG. 4. These characteristics include a simple clipping circuit, a piecewise linear amplifier, or a nonlinear amplifier. Any of these circuits could be used to limit the large scale signal swings of the local average image to the linear display capability of the CRT.

While the local average image is being limited by the nonlinear element, the highpass detail is amplified by increasing the differential amplifier gain to bring the signal level above the noise level of the CRT.

A summing amplifier 66 is connected to the output terminals of the difference amplifier 62 and variable threshold 64 to add the signals back together.

A video processor 68 is connected to the summing amplifier 66 for adding in the sync and blanking signals for standard RS 170 TV displays, and a display 70 is connected to the video processor 68 for displaying the thermal image.

The system described above has been implemented using standard commercial parts and therefor a detailed description is not needed by those skilled in the art desiring to practice the invention. The processing circuit as the nonlinear element was breadboarded on a circuit board. The total power requirements for the two CCD cameras and the processing electronics is 12 watts. Substantial image detail is preserved in the large dynamic range of the CCD cameras.

The processor enhances this detail and clips the local average variation producing a display of detail in hot and cold regions simultaneously. The processor has given highly detailed images for a wide variety of scene contrast situations without requiring adjustments of the monitor controls. Further the use of a clipping circuit as the nonlinear element for the local average limiter has resulted in a certain "flatness" of the displayed image (i.e., a sense of uniform scene temperature). The use of piecewise linear or nonlinear amplifiers for the limiting element restores the visual impression of hot and cold objects in the scene without saturation of blanking and still provide enhancement of image detail.

Figure 5:
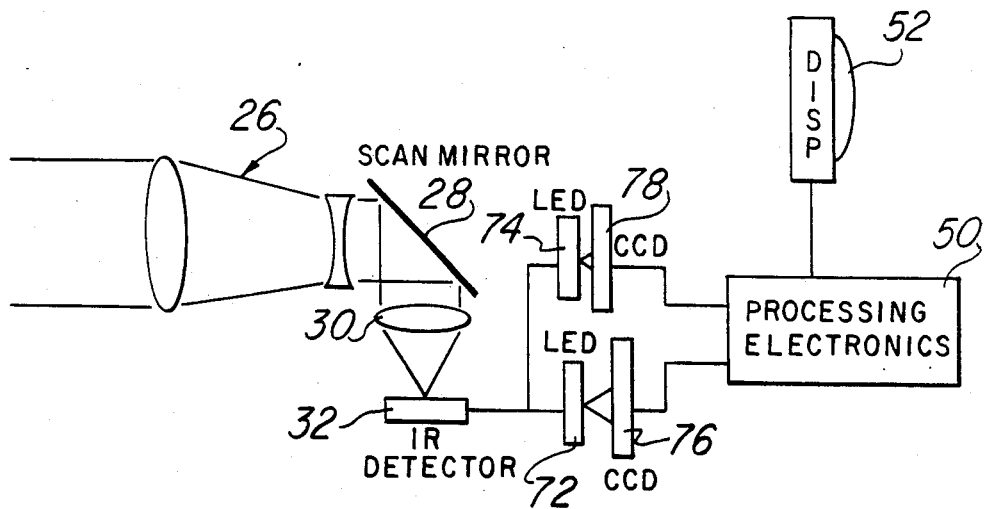
FIG. 5 is a view showing a second embodiment of the processor.

In a second embodiment (FIG. 5), a fast light interconnect processor is used as the image forming portion of the system. This embodiment is similar to the first embodiment in that it is a modified thermal sight having the afocal len system 26, scanner 28, objective lens 30 and IR detector array 32. It differs in that the electrical signals representative of the scene are applied to two linear arrays of LEDs 72 and 74. The LEDs are selectively positioned in front of CCD imagers 76 and 78. The electronic processor 50 is connected to the output terminals of the CCD imagers 76 and 78 for processing the image for display on the CRT 52.

Figure 6:
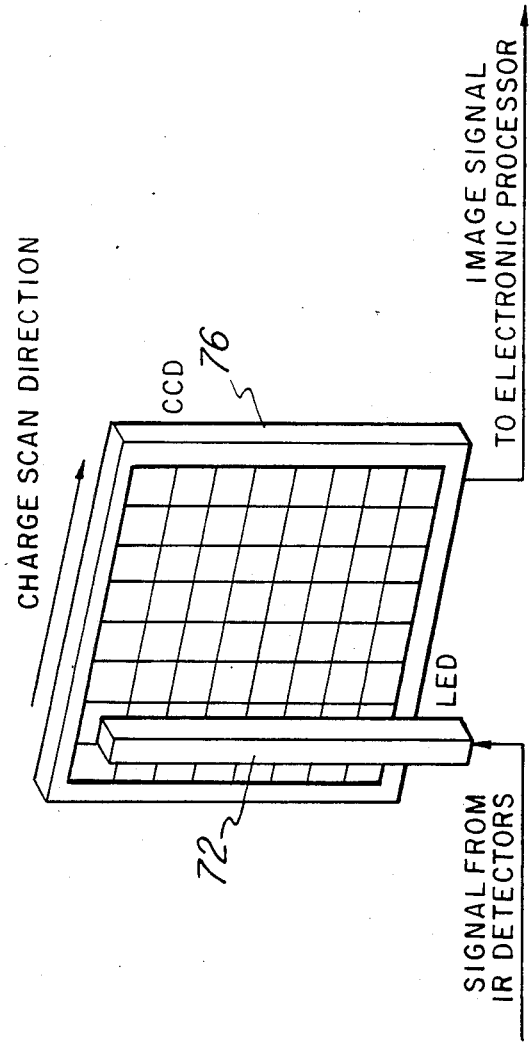
FIG. 6 is a view of the fast light interconnected processing (FLIP) device used in the second embodiment of FIG. 5.

The LEDs 72 and 74 combine with the CCD imagers 76 and 78, respectively, to form the fast light interconnected processor (FLIP) devices (FIG. 6). In the FLIP device an image is formed by displaying the IR detector signals on the LED array 72. The array 72 is placed in a fixed position in close proximity to the CCD imager 76. As a line of the image is displayed the CCD collects the light and stores the line image as a charge distribution in the CCD elements. Before the next line is read in, the charge is shifted electronically by one pixel element. The next line is then read in and the charge distribution shifted again. The image is thus formed line-by-line and is scanned electronically without need for the optical/mechanical scanner. FLIP device are referred to U.S. patent application Ser. No. 656,383, Filed: Oct. 1, 1984 (TI-10649), For: "Fast Light Interconnected Processor".

The optical processing described herein is not limited to the above described examples. The system can be used to the automatic control of dynamic range and enhancement of any image situation where large sudden changes in scene brightness occur. The system could be set up for a real-time image scanner (FLIR, TV etc.) as long as the scanner image can be displayed and sent to the two CCD cameras. The FLIP imagers can be configured to directly input single line video signals to make the processor compatible with any standard TV format image scanner.

In addition the system can be used for the implementation of any synthesized optical transfer function (OTF). This application would require the use of optical spatial frequency filters in the imaging systems before the CCDs and appropriate electronic combination of the detected image signals to complete the synthesis. Such a system could be used to perform feature extraction, pattern recognition, texture analysis, or any other linear filtering operation, for FLIR images, TV images or any other form of scanned images.

Although several embodiments of this invention have been described, it will be apparent to a person skilled in the art that various modifications to details of construction shown and described may be made without departing from the scope to this invention.

What is claimed is:

1. An infrared imaging device comprising:
    a forward looking infrared device having a detector means for detecting infrared energy emanating from a scene and producing electrical signals representative thereof;
    an array of light emitting diodes operatively connected to the detector means for producing a visible image of the detected infrared energy;
    a processing electronics connected to receive the visible image and for producing electrical signals thereof in a preselected format;
    a display means connected to the processing electronics for displaying the information; and
    the processing electronics includes an optical image enhancement processor operatively positioned in the optical path for automatic local area dynamic range normalization, the optical image enhancement processor includes; an image separating means for separating the visible image into a low spatial frequency (lowpass) image and into a high spatial frequency (allpass) image, an electronic means operatively connected to the image separating means for limiting the lowpass image, and a summing means means for adding the low spatial frequency image and the high spatial image.

2. The infrared imaging device according to claim 1 wherein the optical image enhancement processor includes fast light interconnected processor.

3. The infrared imaging device according to claim 1 wherein the processing electronics includes a video processor for generating TV compatible signals including synchronization and blanking signals.

4. The infrared imaging device according to claim 1 wherein the image separating means includes:
    a beamsplitter for separating the visible image into two images; and
    first and second CCD cameras said first CCD camera being set to receive a first member of the two images in sharp focus for allpass filtering to preserve all of the spatial frequency content, and said second CCD camera being set to receive a second member of the two images defocused to be used for spatial lowpass filtering, said defocused image contains averaged image information.

5. The infrared imaging device according to claim 4 wherein the first and second CCD cameras each include sample and hold circuits for serial read out of the image forming signals to provide thereby an lowpass image signal and an allpass image signal.

6. The infrared imaging device according to claim 5 wherein the electronic means comprises:
    a signal subtraction means operatively connected to the sample and hold circuits for subtracting the lowpass image signal from the allpass image signal for obtaining a high spatial frequency information signal;
    a limiting circuit for limiting large scale signal swings of the lowpass image signal to obtained a limited lowpass image signal; and
    a summing means for adding the high frequency information signal to the limited lowpass signal.

7. The infrared imaging device according to claim 6 wherein the limiting circuit includes a piecewise linear amplifier.

8. The infrared imaging device according to claim 6 wherein the limiting circuit includes a nonlinear amplifier.

9. The infrared imaging device according to claim 6 wherein the signal subtraction means comprises a differential amplifier for generating the high spatial frequency information signal (highpass detail) and for amplifying the high spatial frequency information signal.

10. The infrared imaging device according to claim 9 wherein the display means is a cathode ray tube display.

* * * * *